United States Patent [19]

Blum et al.

[11] 4,095,270

[45] June 13, 1978

[54] METHOD OF IMPLEMENTING MANUAL OPERATIONS

[75] Inventors: Arnold Blum, Gechingen; Horst von der Heyden, Boeblingen; Fritz Irro, Boeblingen; Guenter Knauft, Boeblingen; Stephan Richter, Boeblingen; Hermann Schulze-Schoelling, Gaertringen, all of Germany

[73] Assignee: International Business Machines Corporation, Armonk, N.Y.

[21] Appl. No.: 776,576

[22] Filed: Mar. 11, 1977

[30] Foreign Application Priority Data

May 19, 1976 Germany .............................. 2622140

[51] Int. Cl.² .............................................. G06F 9/18
[52] U.S. Cl. .................................................. 364/200
[58] Field of Search ...................................... 364/200

[56] References Cited

U.S. PATENT DOCUMENTS

| 3,568,157 | 3/1971 | Downing et al. | 364/200 |
| 3,618,045 | 11/1971 | Campbell et al. | 364/200 |
| 3,699,532 | 10/1972 | Schaffer et al. | 364/200 |
| 3,972,029 | 7/1976 | Bailey, Jr. | 364/200 |

Primary Examiner—Gareth D. Shaw
Assistant Examiner—Thomas M. Heckler
Attorney, Agent, or Firm—Cyril A. Krenzer

[57] ABSTRACT

A method for performing manual operations, such as address compare equal stop, single cycle alter, etc., in a time slice controlled microprocessor with microprogramming, which avoids stopping the processor clock when any of the programs requires a manual operation. This problem is solved by assigning the manual operations to a specific program, which for the other programs in the multiprogram environment executes the manual operations required.

4 Claims, 7 Drawing Figures

METHOD OF IMPLEMENTING MANUAL OPERATIONS

BACKGROUND OF THE INVENTION

1. Field of the Invention

The invention relates to a method of implementing manual operations in a processor in which several programs are executed under time slice control.

2. Prior Art

Nearly all control of electronic data processing systems must be capable of carrying out manual operations for such systems. Manual operations, such as the address compare equal stop, the program stop or single cycle operations generally serve to test and maintain both the circuits and the programs currently executed on the machines.

By means of the address compare equal stop, which refers to instruction addresses, it can be monitored, for example, whether program branches prescribed by branch instructions have been actually carried out at the specified point in the program. Single cycle operations, for example, can be used to change individual instructions in a program, to withdraw them altogether, or to replace them by other instructions.

Known solutions for implementing such manual operations, which were controlled from the operator console of an electronic data processing system, generally operated in such a manner that the time control logic of the processor had to be accessed by means of control lines, in order to activate the manual operations required. These control lines are activated either manually by console switches or by a second processor which automatically activates the necessary control lines.

This technology has substantial disadvantages, since the circuits required to access the clock control are very expensive and since any stoppage of the clock for executing the manual operations in a time slice controlled multiprogram processor for a particular program leads to all the other programs being stopped and interrupted as well, so that much machine time is lost.

OBJECTS AND SUMMARY OF THE INVENTION

Therefore, it is a principal object of this invention to provide an implementation of manual operations in a time slice controlled multiprocessor which overcomes the foregoing disadvantages of the prior art.

Another object of this invention is to provide a solution for implementing manual operations in time slice controlled multiprocessors, which permits implementing manual operations for a program without requiring extensive technical means.

Still another object of this invention is to provide an implementation of manual operations in a time slice controlled multiprocessor without stopping other programs and without losing the time of the program for which a manual operation is implemented.

The foregoing and other objects and advantages are accomplished according to one aspect of the invention in which the manual operations are assigned to a specific program, which for the other programs in the multiprogram environment executes the manual operations required.

DESCRIPTION OF THE DRAWINGS

FIG. 5 is a time diagram illustrating the processes taking place in connection with an address compare equal stop in the control unit for implementing manual operations; and, FIGS. 6 and 7 are typical representations of the operation of time slice controlled multiprocessors.

DESCRIPTION OF THE PREFERRED EMBODIMENTS

Figure 1:
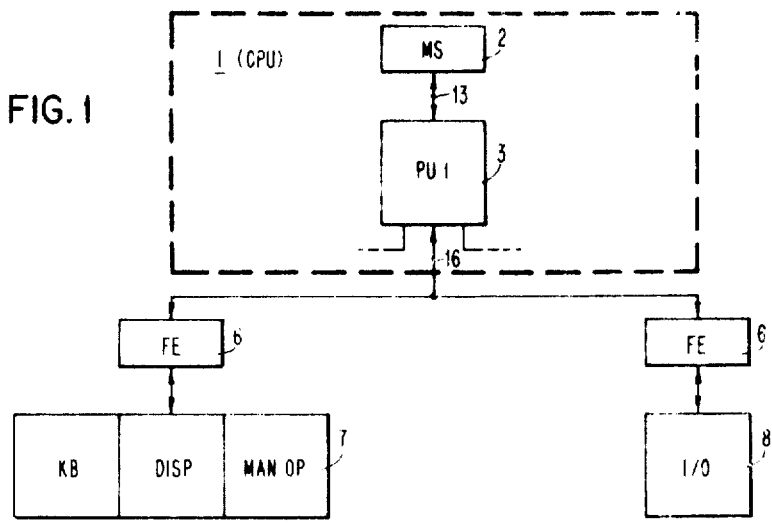
FIG. 1 is a block diagram of a data processing system with a time slice controlled multiprogram processor comprising an arrangement for implementing manual operations.
Figure 2:
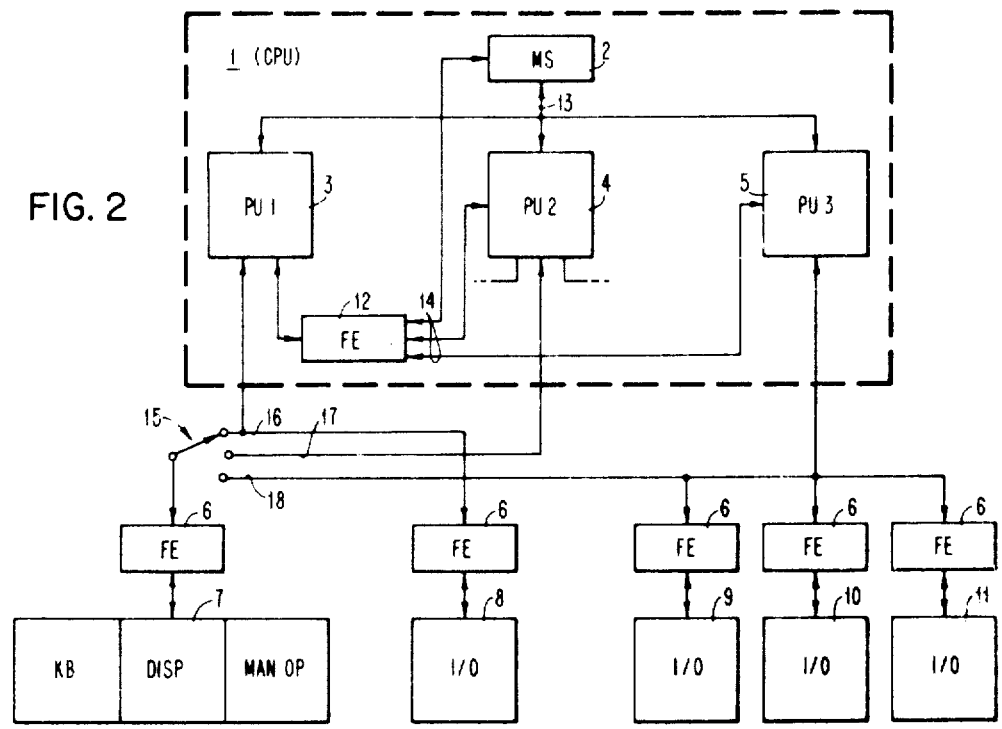
FIG. 2 is a block diagram of an electronic data processing system with several processors, at least one of which is designed for time slice controlled multiprogram operations and which, in connection with the arrangement for implementing manual operations, can implement manual operations both for its programs and the programs of the remaining processors.

FIG. 1 shows the block diagram of an electronic data processing system consisting of a central processing unit (CPU) 1 and of input/output units (I/O) 7 and 8 connected via interface controls or front ends (FE) 6. The central processing unit 1 has a main store (MS) 2, to which one, or as shown in FIG. 2, several processing units (PU 1 to 3) 3 to 5 are connected via a bus system 13. These processing units look after the different functions of the central processing unit. In time slice controlled multiprogram operation the processing unit 3 in FIG. 1 controls, for example, the keyboard KB, the display unit DISP for the dialogue of the operator with the data processing system, as well as the arrangement for implementing manual operations MAN OP, such as single cycle operation or address compare equal stop. Via interface control 6, the same processing unit 3 also controls the input/output units 8, such as printer, disk, store, tape store, or the like. In low-performance data processing systems, processor 3 also controls the problem-oriented programs.

As a result of the more favorable cost/performance ratio, the execution of these jobs of processor 3 in the multiprogramming mode is particularly advantageous with data processing systems of the lower price class.

The cost/performance ratio is also advantageously influenced by carrying out the multiprogramming mode on the basis of the known time slice control (cf. German Pat. No. 2,247,735). With this time slice control, time slices are sequentially allocated to each program, so that the various resources of the data processing system can be used by a particular program for the length or duration of the time slices. For the duration of the subsequent time slice the data processing system is exclusively available to the program next in sequence.

Figure 6:
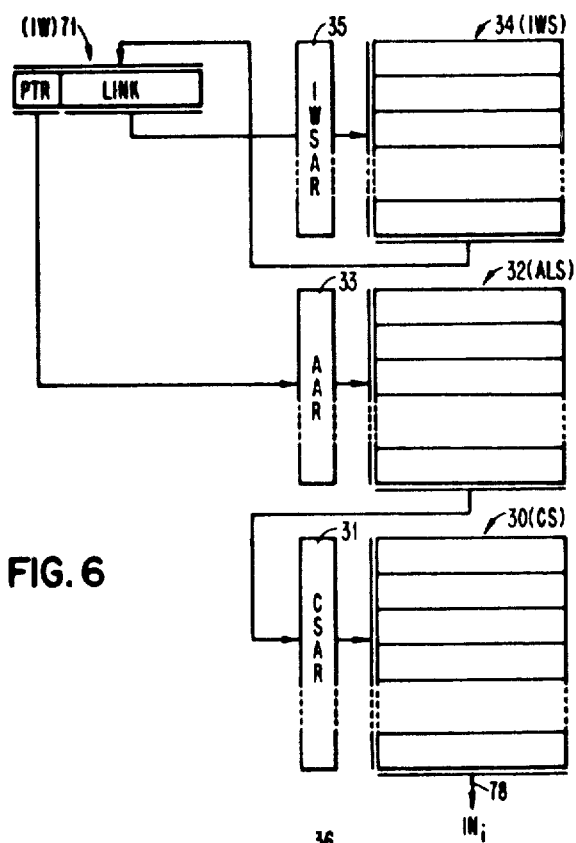

The time slices can be allocated either rigidly, i.e., the machine time available for each program is the same, or dynamically, with the program of the highest priority or the program requiring the greatest amount of programming time being allocated a greater number of time slices at the expense of one or several programs of lower priority or at the expense of programs requiring less programming time. The realization of n programs executed independently of each other initially requires one store, e.g., (ALS) 32 in FIG. 6, in which n instruction addresses are stored. Variable processing time allocation (hereinafter called computing time) necesitates a further store (IWS) 34 for storing index words (IW) 71 consisting of a program pointer (or program address) PTR and a link address LINK.

Thus index word 71 contains two types of information: The first, the so-called program pointer PTR, indicates which of the n programs is allocated to the time slice defined by this index word. The program pointer information available, for example, in binary coded form, is fed to the address register (AAR) 33 of store 32 in which the n instruction addresses are stored, so that after the pointer information has been decoded (for simplicity's sake the address decoders connected in between address register and store are not referred to in the specification or the drawings), the address of the micro instruction to be executed next can be read from the addressed storage location. This address is transferred as usual to the address register (CSAR) 31 of the control store (CS) 30, decoded and used to fetch from the control store the next instruction to be executed.

The second part of the information in the index word is the so-called LINK address which is the address of the index word to be used next. By means of this link address, the time slices can be strung together in the required order. With the aid of the link address, the index word store 34 is addressed via the appertaining index word address register (IWSAR) 35 and the decoder (not shown). Then the next index word which again consists of a program pointer PTR and a link address LINK is read from the addressed storage location.

The index word store 34 is preferably designed in such a manner that it can store more index words than there are programs to be performed independently of each other in processor 3 or the other processors 4 or 5 shown in FIG. 2. Thus a large index word store 34 permits an optimum distribution of the computing time available. If, for example, four programs are provided for a processor and if the selected chain has 16 index words, then a single program can occupy 1/16th to 13/16th of the total computing time. If it happens that out of the programs to be executed only one program is to be run, then the full computing time of 16/16th can be allocated to that program. The individual programs can also automatically add to or reduce their computing time at the expense of one or several programs which at that time run under uncritical time conditions.

Figure 7:
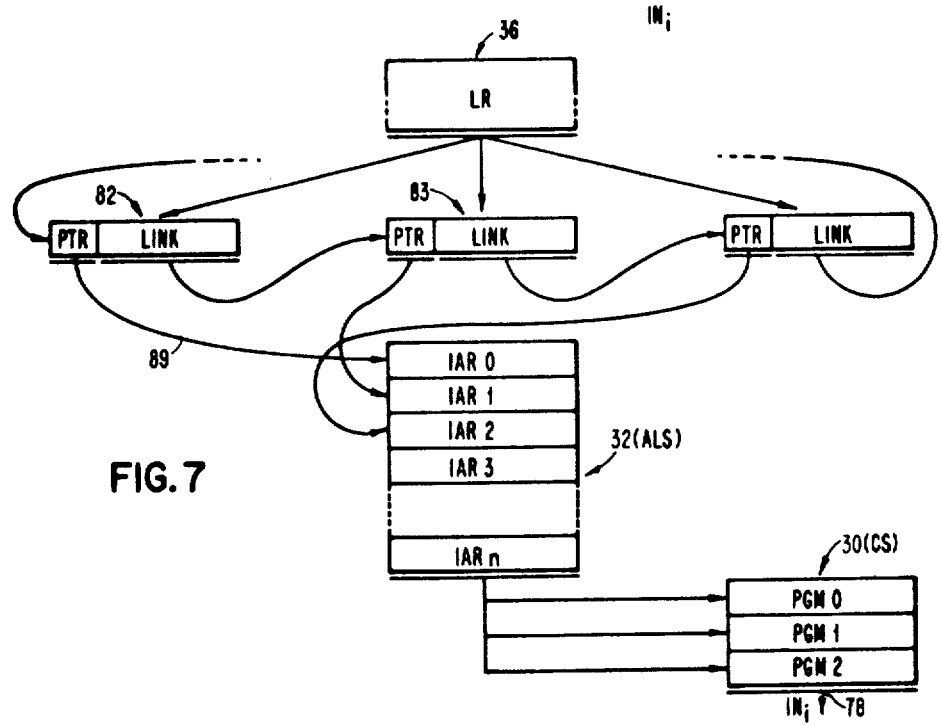

FIG. 7 shows in greater detail the mechanism for allocating the time slices. As shown in the example, the index words are transferred from the index word store 34 in FIG. 6 to an index word register (LR) 36 in FIG. 7. In accordance with FIG. 7, three programs PGM0 to PGM2, for example, can be executed independently of each other in the processor considered. Via line 89, the first index word 82 issued from index word store 34 invokes by means of its program pointer PTR=PTR0 the instruction address IAR0 of program PGM0 in the instruction address store 32. The instruction, in this case a micro instruction INi, to be executed next in connection with the specified program is transferred by means of instruction address IAR0 via output line 78 to the operation register (OP - REG) 63 in FIG. 4 of the processor considered. The LINK address invokes the next index word 83, and so forth. Then the last index word in the index word chain points by means of its link at index word 82.

Figure 3:
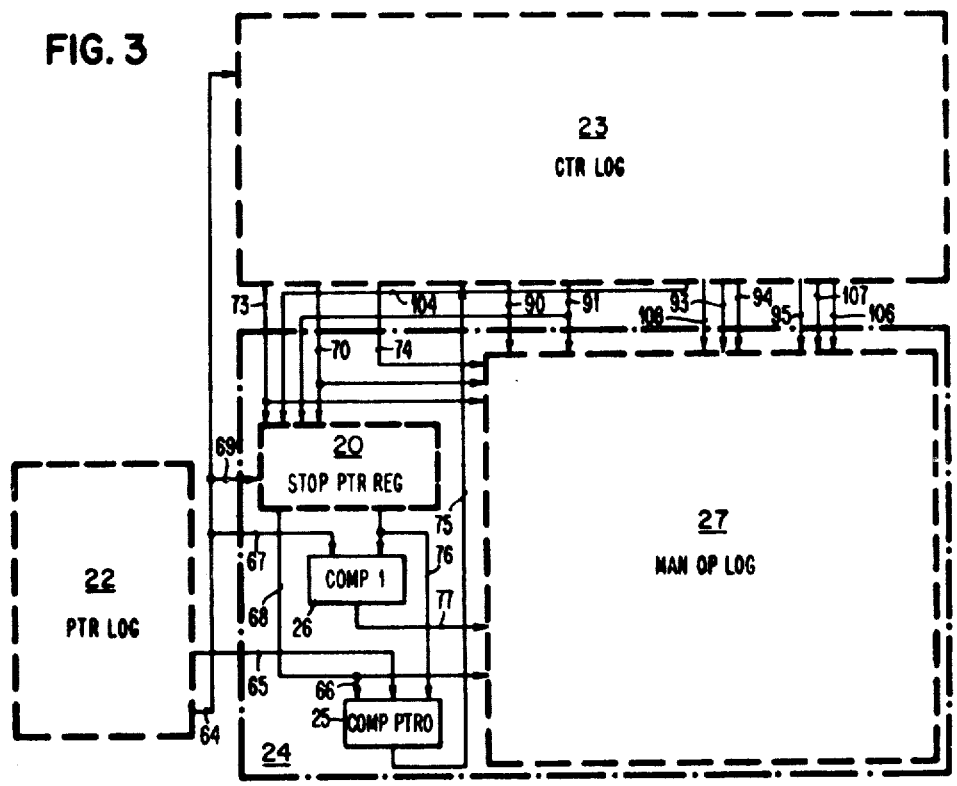
FIGS. 3 and 4 are block diagrams of the essential control complexes of the arrangement for implementing manual operations.

The implementation of the manual operations described here is based on this dynamic time slice control. FIG. 3 is a block diagram of the control 24 necessary for implementing manual operations in a processor, e.g., 3 in FIG. 1. Control 24 consisting of the control (MAN OP LOG) 27, a stop pointer register (STOP PTR REG) 20, a compare circuit (COMPL) 26, and a comparer (COMP PTR0) 25 for the address pointer PTR0. This control 24 for implementing manual operations cooperates closely with the program pointer logic (PTR LOG) 22 and the control logic circuit (CTR LOG) 23 of the respective processor.

Figure 4:
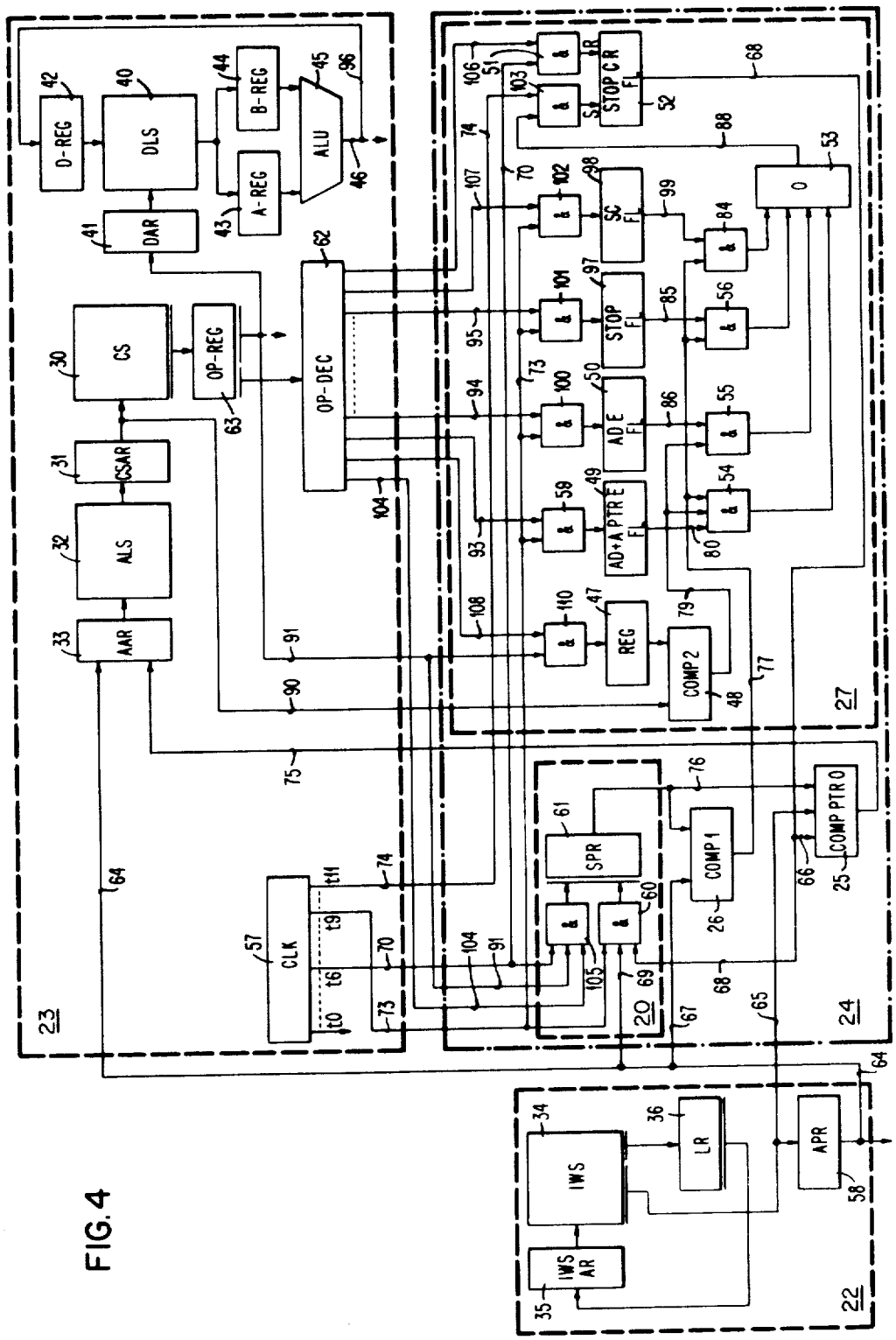

While an instruction of program PGM1 is, for example, being executed in the time slice controlled processor 23 in FIG. 4, the program pointer logic 22 already contains in a special register (APR) 58 the pointer of a program from which the next instruction is to be executed in the respective processor. This pointer is designated as access pointer A PTRi. The look-ahead for the program to be executed next finally enables the implementation of a manual operation which is invariably executed, for example, by time slice program 0 (PGM0) of the computer to be operated. Program PGM0 has been chosen purely arbitrarily, since in principle each of the n programs (PGM0 to PGMN-1) can control the implementation of manual operations.

In the present example it is assumed that program PGM0 is provided for the control of manual operations. If a manual operation (MAN OP), for instance an address stop that is to be implemented upon the occurrence of a particular address, is to be executed in program PGM3, for example, then program PGM3 is stopped, and the time slices allocated to it are additionally added to the program time of program PGM0 which executes the manual operations. Irrespective of the stopped program PGM3, no operating time is lost, since the program time of program PGM3 is additionally allocated to program PGM0. As previously mentioned, this is a great advantage, since with known data processing systems the whole machine had to be stopped for the implementation of manual operations. It is emphasized at this point that manual operations are operations for which the machine is generally stopped when a particular instruction address to be monitored is encountered in the program flow or when particular program instructions are to be subsequently changed or finally when, for program test purposes, a particular part of a program is manually invoked instruction by instruction, i.e., cycle by cycle (cf. also address compare equal stop, address change or single cycle).

The detailed description of the control for implementing manual operations will be preceded by a description of the basic operation sequence in the control logic circuit 23 and the program pointer logic 22 in FIG. 4. The instructions forming the control program of a processor 3 are stored in control store 30. The instructions are sequentially invoked via an address control consisting of the program pointer logic 22, the address register 33 of the address local store 32, and the address register 31 of the control store 30.

While the address register 31 still contains the address of the instruction being executed, the address register 58 for the access pointer contains the address of the program from which the next instruction is to be executed.

The instruction fetched from control store 30 is fed to the operation register 63, whence it is transferred in two parts. The operation code part OP is fed to the operation decoder in the usual manner. The output signals of the operation decoder directly control the gates of the data flow. The remaining part which may consist of operand addresses, data fields or both is made available to the various machine components requiring this information. To the extent to which this part contains operand addresses, it is fed to the address register (DAR) 41 of the data local store (DLS) 40 for invoking the operands required. Via line 91, an access pointer PTR required can also be loaded into a register 47 in control 27 for implementing the manual operations. The significance of this register will be described in detail at some other point in the specification.

Also orthodox is that part of the logic control circuit 23 which implements arithmetic and logic operations. The major units of this part are the above-mentioned data local store 40 and the arithmetic and logic unit (ALU) 45. The arithmetic and logic unit (ALU) 45 receives data, generally A- and B-operands, which are intermediately loaded from data local store 40 into register (A-REG) 43 and register (B-REG) 44.

The operation of the program pointer logic 22 has been described above in connection with FIGS. 6 and 7.

An essential element for controlling the manual operations is a stop pointer register 20 in the control for manual operations 24. The program address pointer PTRi identifying the program to be stopped is entered into the stop pointer register 20 by means of a special instruction. Via AND gate 105 and line 91, the program address pointer PTRi denoting the program to be stopped is entered from the operation register.

The special instruction indicated contains said pointer in its address field; the operation code of this instruction together with a corresponding clock pulse (e.g., t6) cntrols AND gate 105 via operation decoder 62 and line 104.

A further entry into the stop pointer register 20 can be made via an AND gate 60 which is controlled by the output signal of latch 52 and another clock signal (e.g., t9). Via the opened AND gate 60, the access pointer in register 58 is fed on lines 64 and 69 to register 61 storing the actual access pointer. From this stop pointer register 20 the program pointer or pointers, where several programs to be stopped are concerned, are transferred to a compare circuit 26 which then compares the program pointer, available in the form of coded information, with the respective access pointer a PTRj which, as previously mentioned, denotes one cycle in advance the program from which the next instruction is to be executed. If 1=j, said compare circuit 26 generates an output signal. This output signal is fed to control circuit 27 which under special conditions still to be described in detail generates a control signal via register 25. In control logic circuit 23 of the processor in question, e.g., 3, this control signal forces the execution of an instruction from program PGM0.

This forced execution of a particular program represents a deviation from the normal program sequence. Before describing the details forcing a program sequence other than that originally provided, the normal program sequence will again be referred to below. In connection with FIG. 4 it is assumed that the index word IW$_i$ consisting of an access pointer and a link address is available, for example, in a cycle $i$ on the output of the index word store 34 in program pointer control 22. While the link address is fed to the index word register (LR) 36 which via the index word store address register (IWSAR) 35 supplies the address of the next index word to be fetched from index word store 34, the access pointer is transferred to the access pointer register (APR) 58. The access pointer A PTR$_i$ read in this cycle $i$ serves to address the address local store (ALS) 32 indicating the address of the next micro instruction IARi to be executed, while the micro instruction (access pointer PTRi-1) read from store 30 by means of an instruction address IARi-1 is being executed in processor control 23. Thus, for forming the normal program flow, micro instruction by micro instruction is indirectly strung together by means of the access pointer and the link address.

For implementing manual operations, the normal sequential program flow, as previously mentioned, is interrupted for that program in which a manual operation is to be implemented. The program concerned is then stopped without stopping the respective processor, so that the remaining programs not requiring manual operations can be executed in the usual manner. Only program PGM0, which was assigned control during the implementation of the manual operations, is additionally allocated the progam time of the stopped program, so that no processing time is lost.

Manual operations are initiated by means of a newly created micro instruction "S RUN". By program PGM0 the program pointer of the program for which a manual operation is to be implemented is fed to stop pointer register 20 (FIG. 3 or 4). When the last micro instruction of the program concerned is executed, a latch (STOP C R FL) 52 in FIG. 4 is set which indicates in that state that the stop condition has been reached. Via lines 68 and 66, this signal is fed to compare circuit 25, and program PGM0 is forced via line 75 and address register 33.

Before the next instruction of the program concerned is executed, access pointer A PTR$_j$, which is available on the output of register 58 via line 64, is compared in a very short time with the address pointer in stop pointer register 20, i.e., to be exact, in register 61 of said stop pointer register 20. The compare process is carried out by means of a comparer (COMP PTR0) 25 which received the information of the access pointer via line 65 and, via line 76, the information of that pointer which represents the address of a program for which a manual operation is to be implemented. Via line 75, the output signal of the compare circuit 25 is fed to address register 33 which is then set in such a manner that a micro instruction of program PGM0, which is required for implementing a special manual operation, is executed.

This process is repeated each cycle, i.e., micro instruction by micro instruction, for that program for which a manual operation is to be implemented.

It is pointed out in this connection that manual operations for program PGM0 itself cannot be implemented.

As shown in FIG. 4, the circuits of control 27 for manual operations are controlled by specific micro instructions whose control signals are transferred from control logic circuit 23 to control 27 for the manual operations. From control logic circuit 23 essentially clock signals of clock 57 as well as output signals of operation decoder 62, as well as program pointer information from the operation register 63 are fed to control 27 for the manual operations.

In detail the newly created micro instructions permit executing the following control operations:

(a) Stopping a predetermined program.

The initializing operation for stopping a predetermined program, such as program PGM3, consists in transferring the program pointer of said program to stop pointer register 20. To this end a specific micro instruction is used whose operation code generates a gate control signal for opening AND gate 105, said signal being transferred to AND gate 105 via line 104. From the operation register the address part of this special micro instruction is also fed to AND gate 105 via line 91. AND gate 105 transfers this information as a stop pointer to the actual stop pointer register 61 when in addition to said information, a clock pulse t6 is present.

The address pointer of the program to be stopped, which is in stop pointer register 20 and which is applied to a compare circuit (COMP PTR 0) 25 via line 76, is compared with the current access pointers A PTR$_j$ which are transferred to compare circuit 25 via line 65. If the two pointers match, this compare circuit 25 via its output signal on line 75 in connection with the address local store 32 forces the output of program pointer PTR 0 which is executed immediately if the instruction processed at the time has been fully executed.

(b) Stopping a program when the instruction address matches a given address.

Preparatory to this operating mode, register 47 is initially loaded with the required address via a special instruction. As previously mentioned, the operation code serves to open some AND gates, in this case 110, so that the required address contained in the address part of the micro instruction can be transferred from operation register 63, via line 91, to register 47. For simplicity's sake, AND gate 110 is shown without a clock signal input. In principle, however, this gate operates in a similar manner as, for example, AND gate 105 described above.

The required address stored in register 47 is available on a compare circuit (COMP 2) 48 via the output of register 47 and is compared with the current instruction addresses of all programs supplied from the output of the control store address register 31 to compare circuit 48 via line 90.

After this preparatory work has been completed for the operating mode described (address compare equal stop), the actual control functions are carried out. These are again effected by means of a special micro instruction which sets AND gate 100 via a latch (AD E FL) 50. From the operation part of the micro instruction the operation decoder 62 again generates a gate control signal which in connection with the clock signal t9 via line 75 enables said AND gate 100, thus setting latch 50. The output signal of this latch is made available to a further AND gate 55 via line 86. This gate is enabled when compare circuit 48 indicates a positive comparison via line 79. The output signal of the enabled AND gate 55 is fed to latch (STOP C R FL) 52 (input S) via an OR gate 53 and an AND gate 103. As shown in FIG. 4, latch 52 is set when clock signal t11 is applied to said AND gate 103 via line 74.

The output signal of latch 52 is fed to AND gate 60 in the stop pointer register 20 via line 68, so that at clock time t9 access pointer A PTR$_i$ is saved for display in stop pointer register 20 via lines 64 and 69.

When access pointer A PTR$_i$ is again encountered, access pointer A PTR 0 is forced in its place, so that program (PGM i) in which the required address occurred is stopped.

The program in which the required instruction address occurred can be determined by reading the access pointer stored in stop pointer register 20 via a special micro instruction by means of program PGM 0.

(c) Stopping a predetermined program at a predetermined instruction address.

Initially, the program pointer of the program to be stopped is entered into stop pointer register 20 in accordance with operation mode a).

Then register 47 is loaded with the address of the required instruction in accordance with mode b) (the order of the two preceding steps can be reversed).

If the program pointer of the program to be stopped and an access pointer sequentially transferred via line 64 match, compare circuit 26 generates an output signal on line 77, which is transferred to AND gate 54. If the instruction address from the instruction address flow transferred from control store address register 31 via line 90 to compare circuit 48 matches the instruction address stored in register 47, then an output signal which is also transferred to AND gate 54 is generated via line 79.

As latch (AD + A PTR E FL) 49 has been set via AND circuit 59 by a special micro instruction denoting operating mode (c), the condition for AND gate 54 is fulfilled, so that an output signal is transferred via OR gate 53, line 88, and AND gate 103 to latch 52, setting the latter. The output signal of this latch 52 is transferred via line 68 to AND gate 60, so that the latter, in the manner described in connection wth process step (b), transfers the access pointer of the stopped program to the stop pointer register for display.

Simultaneously, the execution of an instruction from program PGM 0 is forced via branch 66 of line 68, via compare circuit 25, and address local store 32.

By means of a subsequent micro instruction both the access pointer of the stopped program and the instruction address available on line 90 can be transmitted for display to display units not shown.

(d) Single cycle operation.

After a required program has been stopped in accordance with one of the modes (a) to (c), which means, amongst other things, that the program pointer of the program to be stopped is already in stop pointer register 20, latch (SC FL) 98 typical for this mode is set also with the aid of a special micro instruction.

By means of a further special micro instruction, latch 52 is reset. During this, the output signal of operation decoder 62 together with clock pulse t6 via line 70 controls AND gate 51 via line 106, said AND gate 51 transferring an output signal to reset input R of latch 52.

This permits the next instruction (micro instruction) of the program to be stopped, e.g., PGM 3, being executed. Via AND gate 84, to which the output signal of latch 98 for the operating mode is applied via line 98, and to which the compare signal of comparer 26 is applied via line 77, as well as via OR gate 53, line 88, AND gate 103, and setting input S, latch 52 is again set, and program PGM 3 is again stopped after only one micro instruction has been executed.

Thus in connection with program pointer logic 22 as well as control logic circuit 23 of the respective processor, control 24 for the implementation of manual operations can perform four different manual operations.

FIG. 5 is a detailed representation of the time sequence encountered in connection with an address compare equal stop, i.e., with operation mode (b).

The top-most line in FIG. 5 shows clock pulses 0 to 11 for a total number of four machine cycles, machine cycle 1 being shown in the left column and machine cycle 4 being shown in the right-most column. Latch 50 for setting operating mode (b) is enabled in the first cycle at clock time 9. It remains in this state at least until the end of the fourth cycle (cf. second line). The third line shows the control of stop pointer register 20. At clock time t6 the pointer of the program to be stopped is stored in stop pointer register 20 and retained there at least until the end of the fourth cycle.

The fourth line from the top shows the access pointers as they appear on line 64, whereas the fifth line shows the pointer of those programs of which micro instructions will be executed in the different cycles. The sixth line shows the output signal of compare circuit 26 in which the program pointer of the program to be stopped, which is stored in the stop pointer register, is compared with the access pointers transferred sequentially via line 64. At clock time t6 in the first cycle the first match between the two pointers is established, and a signal is generated by clock time t2 in the second cycle. At the same time, a match is established in compare circuit 48 between the instruction address on the output of control store address register 31 and a required instruction address previously loaded into register 47. The output signal of compare circuit 48 is shown in FIG. 5 in the seventh line from the top. It also appears concurrently with the output signal of comparer 26, lasting until clock time t6 in the second cycle.

Latch 52, which is set each time a stop condition is fulfilled, is set at clock time t11 via OR gate 53, line 88, and AND gate 103, since the condition for AND gate 55 has also been fulfilled. This is shown in FIG. 5 in the third line from the bottom.

At the end of the second cycle, address local store 32 issued the access pointer for program PGM 0 (cf. FIG. 5, second line from the bottom). As latch 52 is set, the execution of an instruction from program PGM 0 is forced via line 68, compare circuit 25, line 75, and address register 33 of the address local store 31, by releasing pointer PTR 0. This is shown in FIG. 5 in the last line.

Finally, FIG. 2 shows an alternative system embodiment for a central processing system 1 consisting of altogether three processing units (PU1 to PU3) 3 to 5. For the implementation of manual operations it is quite sufficient when the control unit for implementing manual operations, which is also connected to keyboard KB and display unit DISP, provided only once, can be linked to the required processing unit 3 to 5 by means of a switch 15.

While the invention has been described in the context of the preferred embodiments thereof, it will be readily apparent to those skilled in the art that various changes and modifications can be made within the present teaching. It is, therefore, intended that the invention is not to be limited to the specifics of the above-described embodiments, but rather is to embrace the full scope of the following claims.

We claim:

1. A method of implementing manual operations in a processor in which several programs are executed under time slice control, wherein one of the programs is a designated control program to control manual operations as a function of controllable operating mode latches for selecting the required manual operations, comprising:

entering a program pointer for a selected program for which a manual operation is to be implemented into a stop pointer register;

generating an output signal indicating a stop condition has been reached;

comparing the access pointers supplied by a program pointer logic with the program pointer entered in the stop pointer register, said comparison occurring before the next instruction of said selected program is again executed;

transferring in the case of a match the program pointer of the control program to force the execution of an instruction of the control program for the manual operations, whereby, without stopping the execution of the unaffected programs, each time an instruction cycle occurs for the selected program for which a manual operation is to be implemented, these steps are repeated until the manually inputted operation is completed.

2. The method according to claim 1 for executing a program stop in response to a manual input for the selected program by means of a special instruction wherein the operating mode latch of the program stop and the program pointer for the selected program are entered into the stop pointer register, additionally comprising:

comparing in a first and second comparer the program pointer for the selected program with the current access pointers;

setting a latch, when a match occurs, to indicate a stop condition has been reached, whereby the output signal from said latch enables said second comparer and forces in the address register the program pointer of said control program and executes an instruction of said control program to force a stop of the program required.

3. The method according to claim 1 for executing an address compare equal stop in in response to a manual input, wherein a special instruction sets the operating mode latch for the address compare equal stop and loads a designated register with a required instruction address at which a stop is to occur, additionally comprising:

comparing in a third comparer the current instruction addresses throughout the programs with the required address;

generating a signal when a match occurs to set an AND gate whose output signal sets said latch to indicate that a stop condition has been reached; and enabling a second comparer to force the program pointer into the address register to cause an instruction of the control program for manual operations to be executed and the program in which the required address occurred to be stopped.

4. The method according to claim 1 for executing single cycle operations in response to a manual input having a special instruction to cause the appertaining operating mode latch to be set and a designated program to be stopped in accordance with a specified operation mode, wherein the output signal of a selected AND gate controls the actual program stop and a further instruction resets said latch to indicate that a required stop condition has been reached.

* * * * *